Figure 1:
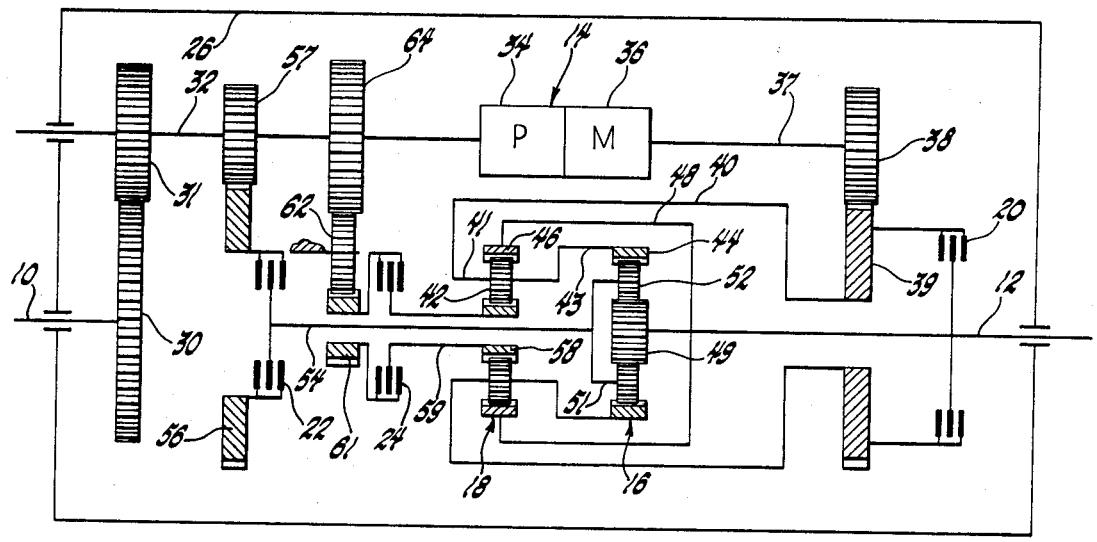

United States Patent [19]

Mooney, Jr.

[11] 3,714,845
[45] Feb. 6, 1973

[54] HYDROMECHANICAL TRANSMISSION
[75] Inventor: James J. Mooney, Jr., Indianapolis, Ind.
[73] Assignee: General Motors Corporation, Detroit, Mich.
[22] Filed: Aug. 24, 1971
[21] Appl. No.: 174,317

[52] U.S. Cl. ................................................74/687
[51] Int. Cl. ..............................................F16h 47/04
[58] Field of Search..........................................74/687

[56] References Cited

UNITED STATES PATENTS 3,396,607 8/1968 Ross........................................74/687
3,433,095 3/1969 Tuck........................................74/687
3,572,164 3/1971 Smith......................................74/687
3,592,077 7/1971 Polak......................................74/687
3,597,997 8/1971 Phillips...................................74/687

Primary Examiner—Milton Kaufman
Assistant Examiner—Thomas C. Perry
Attorney—J. L. Carpenter et al.

[57] ABSTRACT

A hydromechanical transmission having a variable ratio hydrostatic drive unit, two planetary gear sets and three friction drive establishing devices combined to provide an all-hydrostatic drive in a low speed range in both forward and reverse and split power or hydromechanical drives into higher speed ranges in forward.

4 Claims, 2 Drawing Figures

INVENTOR.
James J. Mooney Jr.
BY
Ronald L. Phillips
ATTORNEY

HYDROMECHANICAL TRANSMISSION

This invention relates to hydromechanical transmissions and more particularly to vehicular hydrostatic-mechanical transmissions providing a plurality of speed range drives.

In vehicular transmissions, a variable ratio hydrostatic drive unit offers the advantages of controlled, infinitely variable speed and torque ratios within limited ranges. It is also well known that these ranges can be extended by combining gearing generally of the planetary type with the hydrostatic drive unit and that further advantages can be obtained by employing a split power path, one path being hydraulic and the other being mechanical with improved efficiency resulting from the use of the mechanical power path. Furthermore, if more than one drive range is provided, it is known that a shift between drives can be accomplished by a friction drive establishing device that is speed synchronized for engagement at a predetermined transmission input-output speed ratio. However, increase in the starting tractive effort and expansion of the speed coverage accompanied with reduction in average system pressure in the hydrostatic components is not always available.

The hydromechanical transmission according to the present invention provides for high starting tractive effort and expanded speed range coverage while reducing average hydrostatic system pressure by an arrangement having only two planetary gear sets and simple mechanical power path gear trains combined with a variable ratio hydrostatic drive unit with each speed range drive established by engagement of a single friction drive establishing device which is speed synchronized at a predetermined transmission input-output speed ratio. The hydrostatic unit's pump is driven by the transmission input and the motor is connected to deliver power to the two planetary gear sets. Each of the planetary gear sets comprises a sun gear, a ring gear, and a carried having a pinion meshing with the sun gear and ring gear. One member of one gear set, one member of the other gear set and the motor are all drivingly connected while another member of the one gear set, another member of the other gear set and the transmission output are also drivingly connected. A first clutch on engagement drivingly connects the motor to the transmission output to provide a first speed ratio drive. A second clutch on engagement establishes drive between the transmission input and the third member of the stated one gear set to provide a second speed ratio drive with this drive establishment available at a speed synchronous condition in this clutch at a predetermined speed ratio between the transmission input and output. A third clutch on engagement drivingly connects the transmission input and the third member of the stated other gear set to provide a third speed ratio drive with this drive establishment available at a speed synchronous condition in the third clutch at another predetermined speed ratio between the transmission input and output. The first transmission drive thus provided is an all-hydrostatic drive which provides the same speed range coverage in forward and reverse. Both the second and third transmission drives are split power or hydromechanical drives combining mechanical power and hydraulic power in progressively higher speed ranges in forward.

An object of the present invention is to provide a new and improved hydromechanical transmission.

Another object is to provide a hydromechanical transmission having a variable ratio hydrostatic drive unit, two planetary gear sets and three clutches combined to provide an all-hydrostatic drive in a low speed range in both forward and reverse, and split power drives in progressively higher speed ranges in forward.

Another object of the present invention is to provide a hydromechanical transmission having a variable ratio hydrostatic drive unit, two planetary gear sets and three clutches combined to provide an all-hydrostatic drive in a low speed range in both forward and reverse and hydromechanical drives in progressively higher speed ranges in forward with a speed synchronous condition occuring in each clutch at predetermined and different ratios between the transmission input and output for synchronous shifting between the drives.

These and other objects of the present invention will be more apparent from the following description and drawing in which:

FIG. 1 diagrammatically shows an embodiment of a hydromechanical transmission according to the present invention.

Figure 2:
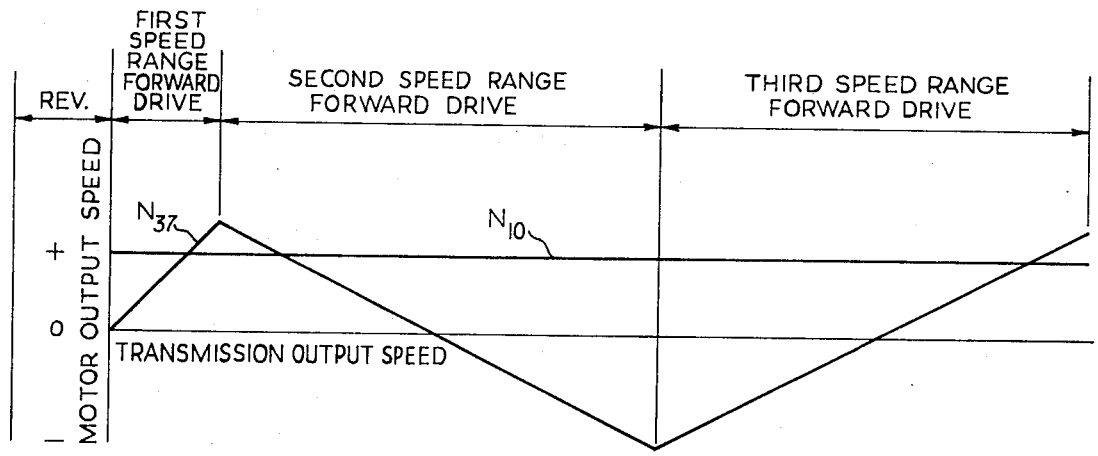

FIG. 2 is a graph showing the FIG. 1 transmission's hydrostatic motor output speed plotted against transmission output speed with constant transmission input speed.

TRANSMISSION ARRANGEMENT

Referring to FIG. 1, there is shown a hydromechanical transmission according to the present invention generally comprising a transmission input shaft 10 operatively drivingly connected to a transmission output shaft 12 by a variable ratio hydrostatic drive unit 14, a pair of planetary gear sets 16 and 18 and spur gear trains including three friction plate type clutches 20, 22 and 24. All the components are suitably supported in a transmission housing generally designated at 26 with the input shaft 10 adapted for connection to a vehicle's engine and the output shaft 12 adapted for connection by a final drive train to the vehicle's driving wheels. The input and output shafts are axially aligned and the two gear sets 16 and 18 and the three clutches 20, 22 and 24 are concentric with the axes of these shafts with the central axis of the hydrostatic unit 14 parallel thereto.

Input power to the transmission is transmitted by the input shaft 10 which is connected to a spur gear 30 that meshes with a spur gear 31 that is connected to the left end of a shaft 32. Shaft 32 is connected at its right end to drive pump 34 of the hydrostatic drive unit 14. Motor 36 of this unit which is hydraulically connected with the pump 34 is connected to drive a motor output shaft 37, the motor output shaft 37 being axially aligned with the pump input shaft 32. The hydrostatic drive unit 14 may be of the conventional type with the pump 34 having variable displacement and the motor 36 having fixed displacement or both the pump and motor may have variable displacement. In the operation described later, the motor will be assumed as having a fixed displacement. With power to pump 34 and by controlling the hydrostatic drive unit's displacement, the motor 36 can be caused to drive the motor output shaft 37 from zero speed in a hydraulic locked condition to some maximum speed in either direction.

Describing now the planetary gearing, each of the planetary gear sets 16 and 18 is of the simple type in that each has a sun gear member, a ring gear member and a carrier member having pinions meshing with the sun gear and ring gear. Describing the connections of the planetary gearing, the motor output shaft 37 is connected at its right end to a spur gear 38 that meshes with a spur gear 39 which is concentric with output shaft 12. The gear 39 is connected by a drum 40 to carrier 41 of gear set 18, the carrier 41 carrying pinions 42 in turn being connected by a drum 43 to ring gear 44 of gear set 16. Thus, the ring gear 44, carrier 41, and motor output shaft 37 are all drivingly connected. In gear set 18, the ring gear 46 is connected by a drum 48 to the output shaft 12. The sun gear 49 of gear set 16 is also connected to output shaft 12. Thus the sun gear 49 of gear set 16, the ring gear 46 of gear set 18 and the output shaft 12 are all drivingly connected.

Describing now the friction drive establishing devices and the other gear drive connections, the clutch 20, which will be referred to as the first speed range clutch, is operable on engagement to connect the spur gear 39 to the output shaft 12 and thus connect the hydrostatic motor 36 to drive the output shaft. The clutch 22, which will be referred to as the second speed range clutch, is operable on engagement to connect the carrier 51 carrying pinions 52 in gear set 16 via a shaft 54 to a spur gear 56 that meshes with a spur gear 57 which is connected to shaft 32. Shaft 54 is arranged intermediate of and aligned with the transmission input and output shafts and extends freely through sun gear 58 of gear set 18. Thus, on engagement of the second speed range clutch 22, the input shaft 10 is connected to drive carrier 51 of gear set 16 in the same direction. The clutch 24, which will be referred to as the third speed range clutch, is operable on engagement to connect the sun gear 58 of gear set 18 via a sleeve shaft 59 to a spur gear 61, shaft 59 being arranged about shaft 54. Gear 61 is concentric with shaft 59 and meshes with an idler gear 62 that in turn meshes with a spur gear 64 which is connected to shaft 32. Thus, on engagement of the third speed range clutch 24, the input shaft 10 is connected to drive the sun gear 58 of gear set 18 in the opposite direction. The clutches 20, 22 and 24 are conventional and together with the hydrostatic drive unit, may be operated in any known way, e.g., electrically, hydraulically, pneumatically, or by some mechanical provision and according to a certain schedule.

OPERATION

The hydromechanical transmission shown in FIG. 1 may be operated to provide a low speed range all-hydrostatic drive in forward and reverse and progressively higher speed range hydromechanical forward drives wherein the speed ratio between transmission input and output in each drive is made variable by the variable ratio drive of the hydrostatic drive unit.

Neutral is provided by disengaging all of the drive establishing devices and conditioning the hydrostatic drive unit 14 so that the motor output shaft 37 is at zero speed. This disconnects all power paths between the transmission input and output. In the transmission drives now to be described, reference will be made to the graph shown in FIG. 2 which shows motor output speed plotted against transmission output speed for a given or constant transmission input speed.

The first and lowest forward speed range drive is established by engaging only clutch 20 to clutch the motor output shaft 37 to drive the output shaft 12. With power to the transmission input shaft 10 the pump shaft 32 is driven at a speed higher than input shaft speed by the ratio of gears 30 and 31 and on conditioning of the hydrostatic drive unit 14 to provide hydrostatic drive to motor output shaft 37 in what will be referred to as a positive sense, the output shaft 12 is driven in what will be called the forward direction which in this arrangement is the same as that of the transmission input shaft 10 and opposite that of the motor output shaft 37. The gear train comprising gears 38 and 39 provides a speed reduction, torque multiplication ratio between the hydrostatic drive unit and the output shaft 12 so that in the first speed range forward drive there is provided very high starting tractive effort with the low motor speed required for this drive enabling low average system pressure in the hydrostatic components. To accelerate the vehicle, the hydrostatic drive unit 14 is conditioned to increase the motor output speed and thus the speed of the output shaft 12 as shown in FIG. 2 by the motor speed curve $N_{37}$ for the constant input speed curve $N_{10}$. Alternatively, all-hydrostatic drive to power the output shaft 12 in reverse is provided by changing the direction of the motor output while only the clutch 20 is engaged. Thus, the reverse drive covers the same speed range as the first forward drive.

In the low speed range forward drive, the ring gear 44 and sun gear 49 of gear set 16 are connected and thus this gear set is locked up with the result that the carrier 51 of this gear set and thus the output member of clutch 22 rotate with the output shaft 12. The gear train provided by gears 56 and 57 provides a large speed reduction, torque multiplication ratio between the pump shaft 32 and the input member of clutch 22 and is determined so that at maximum motor speed which defines the limit of the first speed range drive, the input of clutch 22 is rotating at the same speed and in the same direction as the output of this clutch, such condition thus occuring at a predetermined speed ratio between the transmission input and output. This predetermined transmission input-output speed ratio is preferably set to occur at maximum motor output speed to obtain full benefit of the hydrostatic drive unit's speed ratio range. Since the gear train of gears 56 and 57 has a speed reduction ratio larger than the overdrive ratio in the gear train of gears 30 and 31, the overall transmission ratio throughout the first speed range remains a reduction ratio.

An upshift from the first speed range forward drive to the intermediate or second speed range forward drive is preferably accomplished when the above speed synchronized condition of the second speed range clutch 22 is reached. The second speed range clutch 22 is then engaged and then the first speed range clutch 20 is released. With the second speed clutch 22 engaged, mechanical drive is then transmitted from the transmission input shaft 10 by gears 57 and 56 to carrier 51 of gear set 16 to drive this carrier in the forward direction. With carrier 51 thus mechanically driven in the forward direction, the forward speed component of the hydrostatically driven ring gear 44 subtracts from that of the carrier 51 in the drive they cooperatively provide to drive sun gear 49 and thus output shaft 12 in the forward direction. Thus the speed of sun gear 49 and connected output shaft 12 will increase with decreasing speed of the forwardly rotating ring gear 44 until this ring gear reaches zero speed. Then when the ring gear 44 is driven in the opposite or reverse direction by the motor 36, its reverse speed component adds to the forward speed component of carrier 51 so that the speed of sun gear 49 and connected output shaft 12 increases with increasing speed of ring gear 44 in the reverse direction. Thus, in the intermediate speed range forward drive, the hydrostatic drive unit 14 is operated to decrease the speed of the forwardly rotating ring gear 44 by decreasing the positive motor output speed form maximum to zero and then to reverse the motor direction to thus reverse the direction of ring gear 44 and increase its speed in the reverse direction to continuously increase the speed of transmission output shaft 12. Thus maximum transmission output speed in this range occurs at maximum negative motor output speed with there being provided at an intermediate point in this range an all-mechanical drive at that transmission ratio where motor output speed $N_{37}$ is zero, as shown in FIG. 2. Downshifting from the intermediate to the low speed range forward drive is also provided with a speed synchronized condition at the first speed range clutch 20 since at maximum motor speed in the positive direction in the intermediate speed range drive the gear set 16 is again effectively locked up with the input and the output of the clutch 20 rotating at the same speed and in the same direction though not engaged.

In the intermediate speed range forward drive at maximum negative motor output speed, the carrier 41 of gear set 18 is being driven in the reverse direction while the ring gear 46 of this gear set is being driven in the forward direction at output speed. As the result of this carrier and ring gear drive in gear set 18, the sun gear 58 and connected output of the third speed range clutch 24 are caused to be driven in the reverse direction at a certain speed. The gear train comprising the gears 61, 62 and 64 provides an overdrive between the pump shaft 32 and the sun gear 58 and also provides direction reversal. The gear ratio of this gear train is determined so that at maximum negative motor speed in the intermediate speed range drive, the input of the third speed range clutch 24 is driven by the input shaft 10 at the same speed and in the same reverse direction as the output of this disengaged clutch.

A shift from the intermediate to the third or high speed range forward drive is preferably accomplished when the above speed synchronized condition of the third speed range clutch 24 is reached. The third speed range clutch 24 is then engaged and then the second speed range clutch 22 is released. With the third speed range clutch 24 engaged, mechanical drive is then provided from transmission input shaft 10 to sun gear 58. Thus sun gear 58 is now mechanically driven in the reverse direction which is the same direction that carrier 41 is then being driven by motor 36. The speed component of carrier 41 thus subtracts from that of sun gear 58 in the forward drive they cooperatively provide to ring gear 46 and connected output shaft 12. Accordingly, the speed of transmission output shaft 12 in the forward direction will increase with decreasing reverse speed of carrier 41 until the carrier reaches zero speed. Then when the carrier 41 is rotated in the forward direction, its speed component adds to that of sun gear 58 and thus the speed of ring gear 46 so that the speed of transmission output shaft 12 then increases with increasing speed of carrier 41 in the forward direction. Thus, in the high speed range forward drive, the hydrostatic drive unit 14 is operated to decrease the output speed of motor 36 from its maximum negative speed to zero and then to increase the speed to maximum positive speed to continuously increase the speed of transmission output shaft 12 in the forward direction. Thus the hydromechanical drive provided in the third speed range forward drive is of the same type provided in the second speed range forward drive and operates to expand the speed range coverage provided by this type of drive. Downshifting from high to the intermediate speed range forward drive is also provided with a speed synchronized condition at the second speed range clutch 22 recognizing that at maximum motor output speed in the negative direction in the third speed range forward drive, the output of the second speed range clutch 22 is rotating at the same speed and in the same direction as the mechanically driven input to this clutch.

Thus, the above embodiment of the hydromechanical transmission according to the present invention provides an all-hydrostatic drive in a low speed range in both forward and reverse with large starting tractive effort being afforded in this range with low hydrostatic system pressure since the torque requirements on the hydrostatic unit in this range are low. Then the two hydromechanical drives progressively extend the speed coverage and with a very simple arrangement of clutching and gearing.

The above described embodiment is illustrative of the invention which may be modified within the scope of the appended claims.

I claim:

1. A hydromechanical transmission comprising an input shaft; an output shaft; a variable ratio hydrostatic drive unit having an input member drivingly connected to said input shaft and also having a variable speed output member; a first and a second planetary gear set each having a sun gear member, a ring gear member and a carrier member carrying a pinion meshing with the sun and ring gear members; one member of said first gear set, one member of said second gear set and said variable speed output member all being drivingly connected; another member of said first gear set, another member of said second gear set and said output shaft all being drivingly connected; first drive train means including first drive establishing means for selectively drivingly connecting said variable speed output member and said output shaft to provide a first speed ratio drive between said input shaft and said output shaft; second drive train means including second drive establishing means for selectively drivingly connecting said input shaft and the third member of said first gear set to provide a second speed ratio drive between said input shaft and said output shaft with the drive establishment occurring at a speed synchronous condition in said second drive establishing means at predetermined speed ratio between said input shaft and said output shaft; and third drive train means including third drive establishing means for selectively drivingly connecting said input shaft and the third member of said second gear set to provide a third speed ratio drive between said input shaft and said output shaft with the drive establishment occurring at a speed synchronous condition in said third drive establishing means at another predetermined speed ratio between said input shaft and said output shaft.

2. A hydromechanical transmission comprising an input shaft; and output shaft; a variable ratio hydrostatic drive unit having an input member drivingly connected to said input shaft and also having a variable speed output member; a first and a second planetary gear set each having a sun gear member, a ring gear member and a carrier member carrying a pinion meshing with the sun and ring gear members; one member of said first gear set, one member of said second gear set and said variable speed output member all being drivingly connected; another member of said first gear set, another member of said second gear set and said output shaft all being drivingly connected; first drive train means including first drive establishing means for selectively drivingly connecting said variable speed output member and said output shaft to provide a first speed ratio drive between said input shaft and said output shaft; second drive train means including second drive establishing means for selectively drivingly connecting said input shaft and the third member of said first gear set to provide a second speed ratio drive between said input shaft and said output shaft; and third drive train means including third drive establishing means for selectively drivingly connecting said input shaft and the third member of said second gear set to provide a third speed ratio drive between said input shaft and said output shaft.

3. A hydromechanical transmission comprising an input shaft; an output shaft; a variable ratio hydrostatic drive unit having an input member drivingly connected to said input shaft and also having a variable speed output member; a first and a second planetary gear set each having a sun gear, a ring gear and a carrier carrying a pinion meshing with the sun gear and ring gear; the ring gear of said first gear set, the carrier of said second gear set and said variable speed output member all being drivingly connected; the sun gear of said first gear set, the ring gear of said second gear set and said output shaft all being drivingly connected; first drive train means including first drive establishing means for selectively drivingly connecting said variable speed output member and said output shaft to provide a first speed ratio drive between said input shaft and said output shaft; second drive train means including second drive establishing means for selectively drivingly connecting said input shaft and the carrier of said first gear set to provide a second speed ratio drive between said input shaft and said output shaft; and third drive train means including third drive establishing means for selectively drivingly connecting said input shaft and the sun gear of said second gear set to provide a third speed ratio drive between said input shaft and said output shaft.

4. A hydromechanical transmission comprising an input shaft; and output shaft; a variable ratio hydrostatic drive unit having an input member drivingly connected to said input shaft and also having a variable speed output member; a first and a second planetary gear set each having , sun gear, a ring gear and a carrier carrying a pinion meshing with the sun gear and ring gear; first gear train means drivingly connecting the ring gear of said first gear set and the carrier of said second gear set to said variable speed output member; the sun gear of said first gear set, the ring gear of said second gear set and said output shaft all being drivingly connected; first clutch means for selectively drivingly connecting said variable speed output member and said output shaft via said first gear train means to provide a first speed ratio drive between said input shaft and said output shaft; second gear train means; second clutch means for selectively drivingly connecting said input shaft and the carrier of said first gear via said second gear train means to provide a second speed ratio drive between said input shaft and said output shaft; third gear train means; and third clutch means for selectively drivingly connecting said input shaft and the sun gear of said second gear set via said third gear train means to provide a third speed ratio drive between said input shaft and said output shaft.

* * * * *